United States Patent [19]

Toba et al.

[11] 4,410,584

[45] Oct. 18, 1983

[54] ELECTROSTATIC RECORDING MEMBER

[75] Inventors: Hirotaka Toba; Masanori Itoh, both of Ohimachi; Keita Nakano, Ebina; Shoji Wakoh, Ebina; Toshihiko Toyoshima, Ebina; Hidemasa Todd, Ebina, all of Japan

[73] Assignees: Daicel Chemical Industries, Ltd., Sakai; Fuji Xerox Co., Ltd., Tokyo, both of Japan

[21] Appl. No.: 274,683

[22] Filed: Jun. 17, 1981

[30] Foreign Application Priority Data

Jun. 24, 1980 [JP] Japan ................................ 55-85519

[51] Int. Cl.[3] ............................................ G01D 15/06

[52] U.S. Cl. .................................. 428/215; 162/138; 346/135.1; 346/138; 427/121; 428/206; 428/208; 428/323; 428/328; 428/425.9; 428/480; 428/483; 428/500; 428/423.1; 252/511; 252/512

[58] Field of Search .................... 162/138; 346/135.1; 427/121; 428/207, 208, 211, 323, 328, 511-514, 537, 702, 206, 209, 215, 216, 412, 425, 474.4, 475.8, 480, 483, 500, 516, 518, 522, 523; 346/136-138

[56] References Cited

U.S. PATENT DOCUMENTS 3,861,954 1/1975 Funderburk ........................ 428/331

FOREIGN PATENT DOCUMENTS 41-3308 2/1966 Japan .................................. 427/121
52-74353 6/1977 Japan .................................. 427/121
52-74354 6/1977 Japan .................................. 427/121
2027616A 2/1980 United Kingdom ................ 428/207

*Primary Examiner*—Bruce H. Hess
*Attorney, Agent, or Firm*—Flynn, Thiel, Boutell & Tanis

[57] ABSTRACT

An electrostatic recording member comprising a recording layer, an electrically conductive layer and a support, wherein the electrically conductive layer is composed of from 2 to 40 parts by weight of electrically conductive micro-fine powder dispersed in from 60 to 98 parts by weight of an organic polymer binder, and has a surface resistivity of $10^6$ to $10^8$ Ohms.

8 Claims, 2 Drawing Figures

ELECTROSTATIC RECORDING MEMBER

This invention relates to an electrostatic recording member for use in a system which forms an electrostatic latent image on a recording member by use of a scanner that sequentially supplies signals using needle electrodes (especially multistylus electrodes), and which transfers and fixes a visible image on ordinary paper after the electrostatic latent image is developed.

A system that impresses a signal voltage on a recording member by the use of needle electrodes to form an electrostatic latent image is known as an electrostatic recording system. Generally, this system employs, as a recording member, fabricated paper for electrostatic recording, said paper having an electrically conductive layer sandwiched between a recording layer and a paper substrate. The process involves the steps of forming an electrostatic latent image on the recording paper, and then developing and fixing the latent image. This recording system is not free from the following disadvantages. First, because the recording paper is consumed when recording is effected, the system results in increased copying cost. Second, the clarity of the developed image is affected by the paper quality. Third, there are inevitable limitations on the performance of the electrically conductive material used as the electrically conductive layer, and a change in humidity exerts specifically great influences on the quality of the reproduced developed image.

As one system that overcomes these drawbacks, a transfer-type electrostatic recording system to ordinary paper has recently been attracting increasing attention. According to this system, the electrostatic latent image is first formed on the electrostatic recording member and after development, the developed image is transferred and fixed on ordinary paper (refer to Japanese Patent Publication No. 34077/1971, by way of example).

In accordance with this system, if the electrostatic recording member, after it has been once used, is restored to its original state so as to be usable again, by removing the residual developer and residual charge therefrom, the operating cost would be reduced to attain an economic advantage and a clear picture could be obtained by improving the performance of the recording member. As an electrostatic recording member for this transfer system, there has heretofore been known a type having a construction in which an electrically conductive layer is formed by depositing a vacuum deposition film of a metal on a base film and a recording layer is placed on this electrically conductive film.

However, it is quite difficult to stably produce, by vacuum deposition, a metal film having a surface resistivity in the range of from about $10^6$ to about $10^7$ Ohms, which is believed optimum for the electrostatic recording system, because the resistivity varies remarkably depending on the vacuum deposition conditions for depositing the metal film onto the base film.

The resistivity of the vacuum-deposited metal film is likely to vary remarkably when application of an external voltage is repeated by means of multi-stylus electrodes, corotron or the like, or when ultraviolet rays are radiated during application of corotron. Hence, such a vacuum-deposited metal film is not sufficient for this system which is required to provide a stable picture for an extended period of time.

In an electrostatic recording member which is essentially a three-layered structure consisting essentially of the above-mentioned support, an electrically conductive layer and a recording layer, the present invention provides an improvement in an electrostatic recording member for the transfer system, in which the recording member uses, as the electrically conductive layer, a material having a resistivity falling in a predetermined range with a high level of accuracy, which exhibits a small change in the resistivity with the passage of time and which is stable against the effects of changes in ambient conditions.

Namely, in an electrostatic recording member comprising a recording layer, an electrically conductive layer and a support, the present invention provides an improvement in the electrostatic recording member which is characterized by the features that the electrically conductive layer is composed of from 2 to 40 parts by weight of electrically conductive micro-fine powder dispersed in 60 to 98 parts by weight of an organic polymer binder and the surface resistivity of the electrically conductive layer is in the range of from $10^6$ to $10^8$ Ohms.

Figure 1:
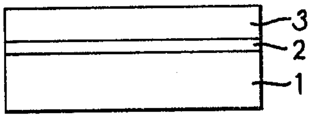
FIG. 1 is a schematic sectional view of an electrostatic recording member in accordance with the present invention.

In the drawings, the reference numerals identify the following elements:

1, the support;

2, the electrically conductive layer; and

3, the recording layer.

The electrostatic recording member for the transfer system, in accordance with the present invention, comprises a three-layered structure consisting essentially of a support 1, an electrically conductive layer 2 and a recording layer 3. As the support, there can be used a flat metal plate or film, such as aluminum, stainless steel, copper, brass or the like, a sheet or film of a polyester, such as polyethylene terephthalate, or a sheet or film of plastics, such as polyvinyl chloride, polycarbonate, polypropylene, polyamide or the like. The support can have a shape, selected from a variety of shapes, such as a drum, a belt or the like, which shape is suitable for subsequent electrostatic recording steps as well as for subsequent treatment.

The electrically conductive layer 2 that constitutes the distinctive feature of the present invention consists essentially of an organic polymer binder and electrically conductive micro-fine powder. Preferably, its surface resistivity falls in the range of $10^6$ to $10^8$ Ohms and its thickness is in the range of from several microns to several dozens of microns. If the thickness of the electrically conductive layer 2 is too small, the surface resistivity is not maintained uniform on the same plane due to non-uniformity of the thickness of the layer and variations in the image density occur after recording. Preferably, therefore, the thickness of the layer 2 is sufficiently large that the surface resistivity is not significantly affected by the thickness of the layer 2. A preferred thickness of the layer 2 is from 5$\mu$ to 30$\mu$, preferably 15 to 30$\mu$, more preferably 10 to 25$\mu$.

If pin holes exist in the electrically conductive layer 2, they exert bad influences on the recorded image, such as blank recording near the pin holes. Accordingly, it is necessary to carefully form the electrically conductive layer 2 to avoid the formation of pin holes. To avoid the formation of the pin holes, a uniform continuous film can be formed by applying to the support 1, at least twice, a coating liquid for forming the electrically conductive layer 2. This also results in an improvement in the recorded image quality.

Solvent-type binders, water-soluble type binders and aqueous dispersion resin-type binders can be used as the organic polymer binder in the electrically conductive layer 2 of the electrostatic recording member of the present invention. Preferred synthetic resins include polyurethane, polyester, vinyl chloride/vinyl acetate copolymer, nitrile rubber, (meth)acrylic acid ester-type resin, vinyl acetate-type resin, polyamide resin, and so forth. Among these binders, polyurethane (isocyanate cross-linkage) and (meth)acrylic-type resin (melamin cross-linkage) are especially preferred as the binders because they exhibit stable surface resistivity despite variations in the ambient factors, such as a wide range of temperatures, humidity, etc. It is preferred to use solvent-type, cross-linkable resins.

Carbon black, graphite, metal powder, metal oxide powder and the like can be used as the electrically conductive micro-fine powder that is dispersed in the electrically conductive layer 2. Among them, electrically conductive carbon black is most preferred because it has an excellent dispersion stability in the binder resin, it has excellent chemical stability and durability, and the kind and proportions of addition thereof can be so adjusted as easily to provide the required surface resistivity of the layer 2. High resolution and recording density can be obtained if at least 90% of the dispersed electrically conductive particles dispersed in the binder resin consist of particles having a particle size of below 0.5$\mu$, when carbon black is employed as the micro-fine powder.

In order to obtain a surface resistivity in the range of $10^6$ to $10^8$ Ohms required for the electrically conductive layer 2 of the electrostatic recording member in the present invention, it is necessary to adjust the weight ratio of the electrically conductive micro-fine powder to the organic polymer binder, taking into account the type of organic polymer binder that is used. Generally speaking, this can be accomplished by adding from 2 to 40 parts by weight of the electrically conductive micro-fine powder to 60 to 98 parts by weight of the organic polymer binder, to provide a total of 100 parts by weight of powder plus binder. If the surface resistivity of layer 2 is below $10^6$ Ohms or above $10^8$ Ohms, the density of the developed image becomes thin and the developed image gets "fat" and becomes unclear.

Although variations occur depending on the multi-stylus system used and other conditions, the optimum surface resistivity of the electrically conductive layer 2 that provides the most distinct developed images in electrostatic recording may preferably vary lower or higher by ten, in response to variations in the ambient conditions, such as temperatures (5° to 45° C. ), humidity (10 to 90% R.H.), and so forth. Within this range of resistivity, even a slight change in the addition amount of the electrically conductive micro-fine powder may cause a great change in the resistivity. Therefore, it is necessary to weigh the amount of the electrically conductive micro-fine powder added to the organic polymer binder with a high level of accuracy and to carefully mix and disperse the powder to prepare a uniform coating dispersion.

On the other hand, as will be shown in the later-appearing Examples and Comparative Examples, the conductivity of the layer 2 changes remarkably depending on the kinds and the specific combinations of the organic polymer binder and the electrically conductive micro-fine powder. Since the conductivity is also affected by the degree of dispersibility (compatibility) of the electrically conductive micro-fine powder with the organic polymer binder, it is useful to select and add suitable additives such as solvents, plasticizers, emulsifiers, dispersants, and the like, in order to specifically improve the dispersibility.

The recording layer 3 of the electrostatic recording member of the present invention is essentially a dielectric having a volume resistivity of at least $10^{12}$ ohm.cm, preferably at least $10^{14}$ ohm.cm, in order to store the charge on the surface thereof during electrostatic recording. As the dielectric material, it is possible to use organic dielectric substances, exemplified by polyesters, polycarbonates, polyamides, polyurethanes, (meth)acrylic-type resins, styrenetype resins, polypropylene, etc., or mixtures of inorganic dielectric powders, e.g., $TiO_2$, $Al_2O_3$, MgO, etc. and organic dielectric substances. The recording layer 3 can be formed by coating, on the layer 2, a solution of resin or bonding a film of the resin thereto. To avoid dielectric breakdown, the recording layer 3 must have a thickness of at least 1$\mu$, and preferably up to 20$\mu$, especially 2 to 6$\mu$, in order to obtain satisfactory resolution.

When a cross-linkable resin is used as the organic polymer binder in the electrically conductive layer 2 of the electrostatic recording member of the present invention, it is possible to obtain the following effects:

(1) The surface resistivity is scarcely affected by the temperature and humidity;

(2) Because a cross-linking agent is added, adhesion between the electrically conductive layer 2, the support 1 and the recording layer 3 can be improved;

(3) When carbon black is used as the electrically conductive micro-fine powder, high stability can be obtained with respect to ambient factors such as temperature, humidity, light, and the like;

(4) A developed image having high resolution and high density can be obtained because the particles are minutely dispersed;

(5) The electrically conductive layer 2 having the required surface resistivity can be formed with high reproducibility by adjusting the amount of addition of carbon black;

(6) When the conductivity parallel to the surface of the electrically conductive layer 2 is employed, aggregated particles of carbon or carbon particles serve as a kind of capacitor even when a high voltage is locally impressed thereon, so that a large local current can be mitigated within a relatively short period of time and electrostatic recording at a high frequency can be accomplished sufficiently;

(7 ) Economy of production and mechanical and electrical durability can be obtained; and (8 ) When a thin film is employed as the recording layer 3, the dielectric film can be heat-laminated directly (without using an adhesive) to the electrically conductive layer 2.

The electrostatic recording member of the present invention is one that is used for the system which transfers a developed image to ordinary paper, that is not electrically degraded even when it is used repeatedly and that always provides a high quality developed image. No decrease in the performance is observed after recording tests are repeated 30,000 times. The electrostatic recording system using the electrostatic recording member in accordance with the present invention has a sufficiently high recording speed, the quality of the resulting developed image is satisfactory and maintenance of the copying machine can be effected easily. For these reasons, the recording member of the invention can widely be used for facsimile, various printers, and so forth.

Hereinafter, the present invention will be further described by referring to illustrative Examples thereof. In the Examples, the term "part or parts" represents "part or parts by weight". In the Examples, the surface resistivity is measured in the following manner.

The electrostatic recording member is cut into a rectangle having a length of 7 cm and a width of 10 cm. Strips of the recording layer 3 having a width of 1.5 cm are removed along both long sides of the rectangular electrostatic recording member. A grounding material is applied to the removed portions and is then dried so that the portion of the recording member that is measured is a square wherein each side is 7 cm long. As the grounding material, the proportion of addition of carbon black to the binder is so increased that the surface resistivity of the dried film of grounding material is approximately $10^3$ Ohms. The grounding portions along both sides are clamped by metal clips and a constant voltage of 25 V is applied across them by use of a variable d.c. constant voltage/current power source, Model 410-350, a product of Metronix Co., Ltd. The current (I) flowing between them is read by use of a digital multimeter produced by K.K. A & D. The surface resistivity R (Ω) is calculated in accordance with the following equation:

$$R(\Omega)=25/I$$

EXAMPLE 1

47.1 parts of a single solution-type urethane resin ("Rezalyod", solid content 30%, a product of Dai-Nippon Seika), 18.9 parts of carbon black ("Seika- Seven", solid content 31%, a product of Dai-Nippon Seika) that was pre-dispersed, and 34 parts of methyl ethyl ketone were mixed and stirred for 30 minutes. Next, after a cross-linking agent was added, the mixture was stirred for 15 minutes to prepare a coating dispersion (solid content=20%, weight ratio of carbon black to resin=18.5/81.5). The coating dispersion was applied, by a bar coater, onto a 75μ-thick polyester film (a product of Diyafoil K.K.) so that the thickness of the dried film was about 20μ. The film was then dried to provide an electrically conductive layer 2. A 6μ-thick polyester film was heat-laminated to the conductive layer to provide a recording layer 3.

Figure 2:
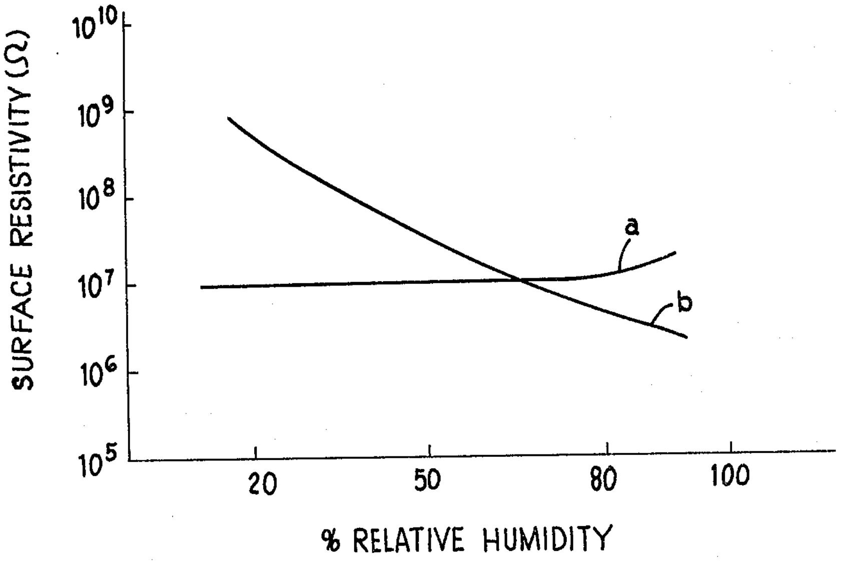
FIG. 2 is a graph showing the performance of the electrostatic recording member in accordance with the present invention.

Using this three-layered sheet as a recording member, the electrically conductive layer 2 was exposed at the edge portions of this recording member in order to measure the surface resistivity of the electrically conductive layer. It was found to be $1\times10^7$ Ohms. The change in the surface resistivity, caused by changes in humidity, was found to be slight. In FIG. 2, the line a represents the measured surface resistivity value of the electrically conductive layer 2 of Example 1, whereas the line b represents the measured surface resistivity value of an electrostatic recording paper impregnated with a conventional electroconductive agent. Using this recording member, a signal voltage was applied at an impressed voltage of +650 V. After development, the developed image was transferred and fixed to ordinary paper. A satisfactory developed image perfectly free of "fatting" of the picture was obtained. Application of this signal voltage, development, transfer and fixing were repeated 10,000 times and the resulting developed images were all satisfactory.

EXAMPLE 2

28.8 parts of a double liquid-type urethane ("Rezamine", a product of Dai-Nippon Seika, solid content 45%) as the binder resin, 23.5 parts of carbon black ("Seika-Seven", a product of Dai-Nippon Seika, solid content 30%) that was pre-dispersed, and 47.7 parts of methyl ethyl ketone were mixed and stirred for 30 minutes. After a cross-linking agent and a promoter were added, the mixture was stirred for 15 minutes to prepare a coating dispersion (solid content 20%, weight ratio of carbon black to resin=25/75). The coating dispersion was applied and dried so that the thickness of the dry film was approximately 20μ. Thereafter, the same procedures as described in Example 1 were carried out to form a recording member. The surface resistivity of the electrically conductive layer 2 thereof was $5.5\times10^6$ Ohms.

Using this recording member, the developed image formation tests were carried out in the same manner as described in Example 1, and there was obtained a satisfactory developed image that was perfectly free of "fatting".

EXAMPLE 3

41.2 parts of an acrylic emulsion ("Sebian A", a product of Daicel Kagaku K.K.) as the binder resin, 7.8 parts of carbon black ("AM Black", a product of Dai-Nippon Seika, solid content 44.7%) that was predispersed, and 51 parts of deionized water were mixed and stirred for 30 minutes to prepare a coating dispersion (solid content 20%, weight ratio of carbon black to resin=17.5/82.5). The coating dispersion was applied and dried so that the thickness of the dry film was approximately 20μ. The same procedures as described in Example 1 were carried out to provide a recording member. The surface resistivity of the electrically conductive layer 2 thereof was $1.22\times10^7$ Ohms.

Developed image formation tests were carried out using this recording member in the same way as described in Example 1, and there was obtained a distinct developed image that was perfectly free of "fatting". The developed image formation procedures were repeated at least 10,000 times and the clarity of the developed image was not at all degraded.

EXAMPLE 4

The acrylic emulsion and pre-dispersed carbon black, that were used in Example 3, and a 1:1 (weight ratio) mixed solvent of deionized water/isopropyl alcohol, used in place of the deionized water employed in Example 3, were mixed in the proportion of 30 parts, 17.9 parts and 52.1 parts, respectively, and were stirred for 30 minutes to prepare a coating dispersion for forming the electrically conductive layer (solid content 20%, weight ratio of carbon black to resin=40/60). A recording member was then prepared in the same way as described in Example 1, and the surface resistivity of the electrically conductive layer was measured. It was found to be $3.5\times10^7$ Ohms. Using the resulting recording member, the developed image formation tests were carried out in the same way as described in Example 1. There was obtained a satisfactory and clear picture that was perfectly free of "fatting".

EXAMPLE 5

7.5 parts of carbon black was mixed with 92.5 parts of a 2:1 MEK/toluene (weight ratio) solution containing 17.5 wt. % of ethylene-vinyl acetate copolymer/nitrile rubber=67.8/32.2 (weight ratio). The mixture was kneaded for 12 hours by use of a ball mill to prepare a coating dispersion. The coating dispersion was applied to a 100μ-thick polyester film and dried so that the thickness of the dry film was approximately 20μ. The same procedures as described in Example 1 were carried out to provide a recording member. The surface resistivity of the electrically conductive layer 2 was $5\times10^{6}$ Ohms. Using this recording member, the developed image formation tests were carried out in the same way as described in Example 1. There was obtained a satisfactory and distinct developed image that was perfectly devoid of "fatting".

COMPARATIVE EXAMPLE 1

The acrylic emulsion, pre-dispersed carbon black and deionized water, that were used in Example 3, were mixed in the proportion of 25 parts, 22.4 parts and 52.6 parts, respectively, and were stirred for 30 minutes to prepare a coating dispersion for preparing an electrically conductive layer (solid content 20%, carbon black/resin weight ratio=50/50). A recording member was produced in the same way as described in Example 1, and the surface resistivity of the electrically conductive layer 2 was measured. It was found to be $1\times10^{4}$ Ohms. Using this recording member, the developed image formation tests were carried out in the same was as described in Example 1, but because the resistivity was too low or for other reasons, the picture became excessively fat and unclear.

COMPARATIVE EXAMPLE 2

In place of the film described in Example 1, in which the electrically conductive layer 2 was applied in a thickness of 20μ on a 75μ-thick polyester film, this Comparative Example used a vacuum deposited, indium oxide, transparent, electrically conductive film (a product of Teijin K.K.), and a 6μ-thick polyester film (Mylar) was laminated on the conductive film using an adhesive to provide a recording member. Using the recording member thus produced, the developed image formation tests were carried out in the same way as described in Example 1. Although a clear developed image was obtained at the initial state, the picture got thinner with the passage of time and thereafter only an unclear picture could be obtained. The cross-linking agent used in the above mentioned examples was a condensate between trimethylolpropane and tolylenediisocyanate (weight ratio was 1:3 ) and the amount was 1.4 parts.

The embodiments of the invention in which an exclusive property or privilege is claimed are defined as follows:

1. An electrostatic recording member adapted to be used for repetitive formation and development of electrostatic latent images, followed by transfer of the developed images from said member to successive separate paper sheets, said member consisting essentially of:

a support in the form of a film or sheet, said support consisting essentially of a synthetic resin;

an electrically conductive layer laminated directly on top of said support, and electrically conductive layer being free of pin holes, having a thickness of from 5 to 30 microns and consisting essentially of 2 to 40 parts by weight of fine powder of electrically conductive material uniformly dispersed in 60 to 98 parts by weight of an organic polymer binder selected from the group consisting of cross-linked polyurethane, cross-linked acrylic resin and cross-linked methacrylic resin, so that the sum of said binder and said powder is 100 parts by weight, said electrically conductive layer having a surface resistivity in the range of from $10^{6}$ to $10^{8}$ ohms; and a recording layer laminated directly on top of said electrically conductive layer, said recording layer having a thickness of from 1 to 20 microns and consisting essentially of a dielectric material having a volume resistivity of at least $10^{12}$ ohm.cm.

2. An electrostatic recording member as claimed in claim 1 in which said electrically conductive layer has a thickness in the range of from 15μ to 30μ.

3. An electrostatic recording member as claimed in claim 1 or claim 2 in which said electrically conductive material is selected from the group consisting of electrically conductive carbon black, metals and metal oxides, said electrically conductive material being non-photoconductive.

4. An electrostatic recording member as claimed in claim 1 in which said electrically conductive material consists essentially of electrically conductive carbon black and at least 90% of said electrically conductive carbon black particles have a particle size of less than 0.5μ.

5. An electrostatic recording member as claimed in claim 4 in which both of said support and said recording layer consist of polyester resin.

6. An electrostatic recording member as claimed in claim 1, wherein said support consists of synthetic resin selected from the group consisting of polyester, polyvinyl chloride, polycarbonate, polypropylene and polyamide.

7. An electrostatic recording member as claimed in claim 1 or claim 6, in which said support has the shape of a drum.

8. An electrostatic recording member as claimed in claim 1 or claim 6, in which said support has the shape of a belt.

* * * * *

UNITED STATES PATENT AND TRADEMARK OFFICE

CERTIFICATE OF CORRECTION

PATENT NO. : 4 410 584

DATED : October 18, 1983

INVENTOR(S) : Hirotaka TOBA et al

It is certified that error appears in the above-identified patent and that said Letters Patent is hereby corrected as shown below:

On the title page, at item [75] change the name of the last inventor listed therein to ---Hidemasa Todo---.

Column 8, line 12; change "and" to ---said---.

Signed and Sealed this

*Seventh* Day of *February 1984*

[SEAL]

*Attest:*

GERALD J. MOSSINGHOFF

*Attesting Officer* *Commissioner of Patents and Trademarks*